R. Z. TYLER.
CONTROL DEVICE.
APPLICATION FILED JUNE 12, 1920.
1,402,549.
Patented Jan. 3, 1922.
3 SHEETS—SHEET 2.
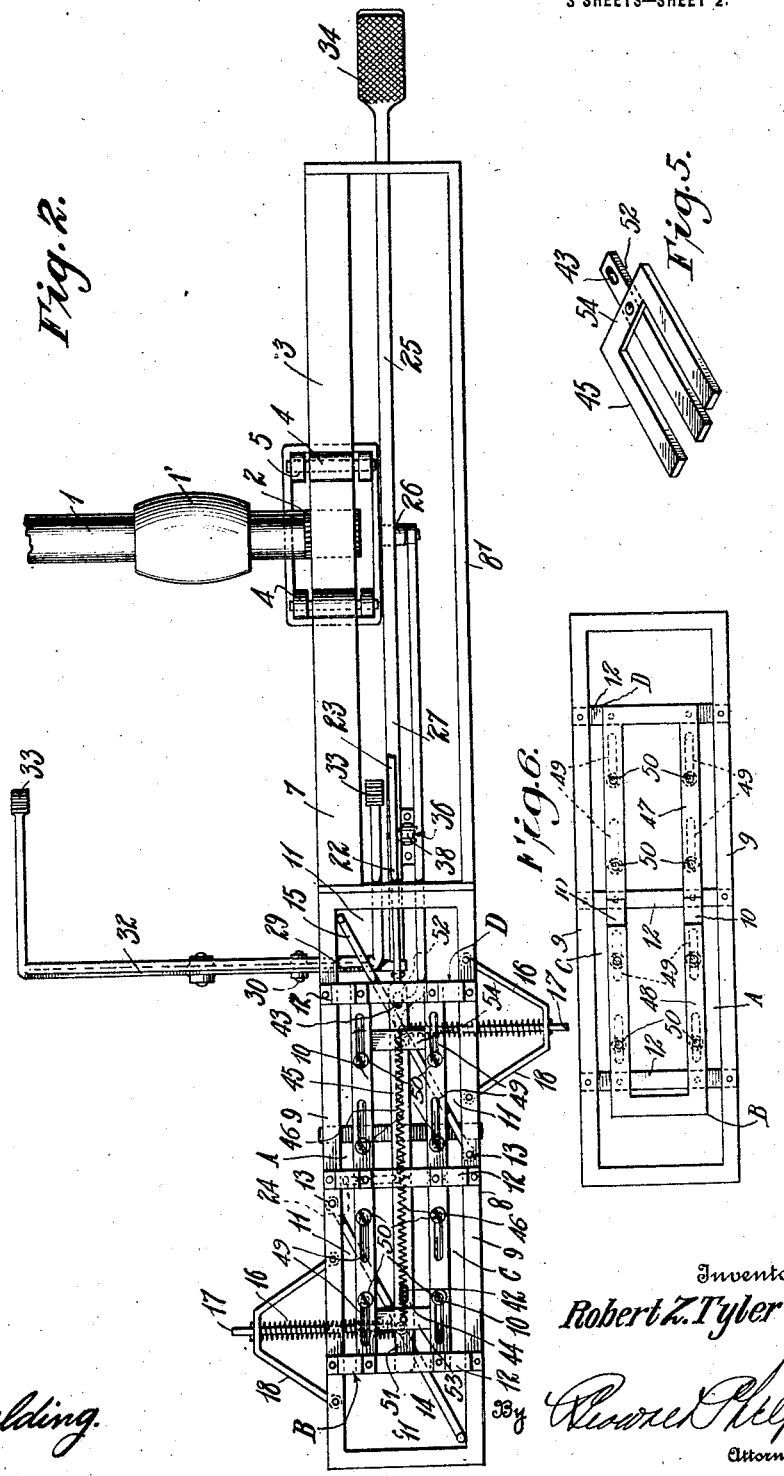
Witness
W. C. Fielding.
Inventor
Robert Z. Tyler
By
Attorneys

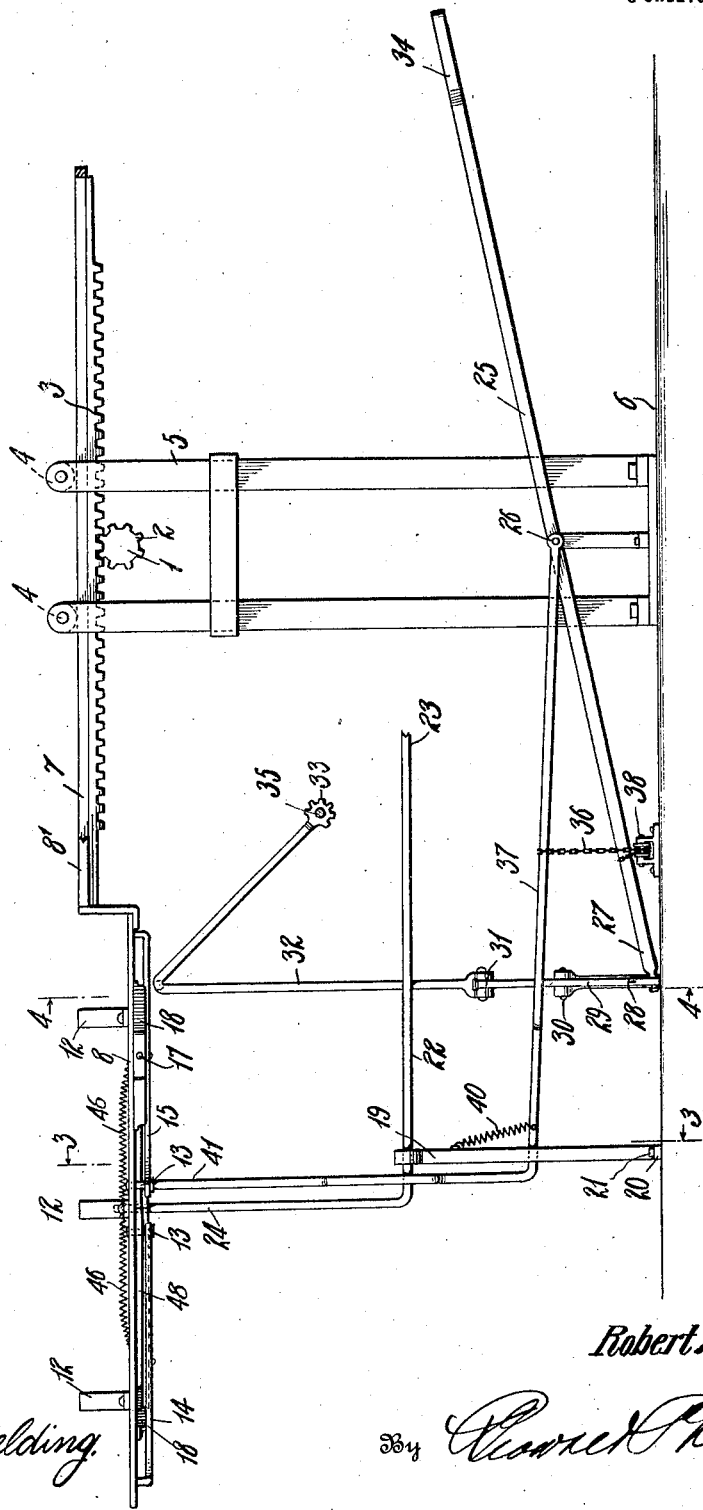

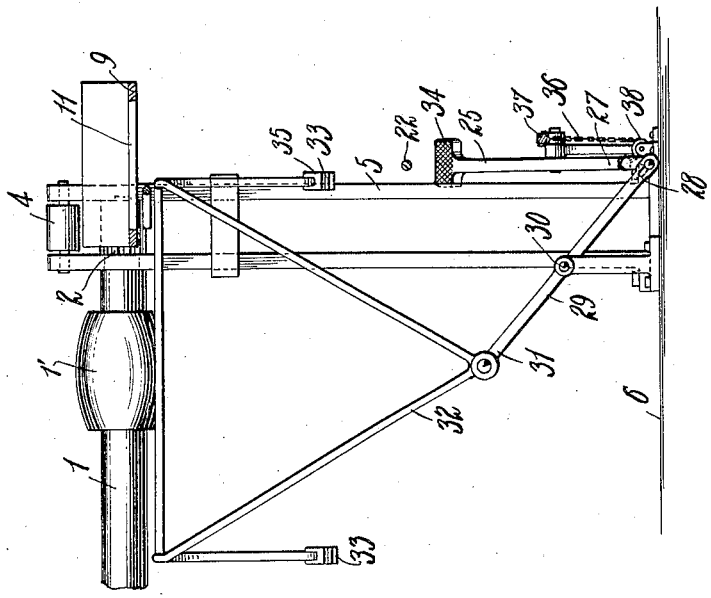

UNITED STATES PATENT OFFICE.

ROBERT Z. TYLER, OF ATLANTA, GEORGIA.

CONTROL DEVICE.

1,402,549. Specification of Letters Patent. Patented Jan. 3, 1922.

Application filed June 12, 1920. Serial No. 388,448.

*To all whom it may concern:*

Be it known that I, ROBERT Z. TYLER, a citizen of the United States, residing at Atlanta, in the county of Fulton and State of Georgia, have invented certain new and useful Improvements in Control Devices, of which the following is a specification.

In rolling fenders, such as automobile fenders or mud guards, and the like sheet metal articles, where, in order to produce a perfect finished product, the machine, after it has drawn the sheet metal blank between its rolls the full length desired to properly shape it, must be reversed in its operation at exactly the proper time, considerable loss has been commonly due to the fact that, even when a skilled operator is controlling the machine, such reversal is not properly timed by the operator and the article operated upon is damaged.

One object of this invention is to provide a control device, preferably in the form of an attachment for machines of this and similar types, which, regardless of the lack of skill or experience of the operator, will automatically reverse the direction of operation of the machine at exactly the proper moment to produce a finished product without blemishes and true to specifications.

Another object of the invention is to so adapt machines of the above mentioned class that they may be controlled and operated by one person only as contrasted with the present operation of such machines which, to the best of knowledge, require at least two attendants.

Machines equipped with the device of my invention may be operated at a greater speed than hand-controlled machines, for the reason that the reversing of the machine is automatic and is not dependent upon the operator determining the proper time for reversing, and consequently there need be no slowing down of the machine when that time arrives to avoid a mistake being made.

Futhermore, I incorporate in my device means whereby it may be adjusted to lengthen the travel of the rolling mechanism in either direction so as to accommodate work of different lengths.

Other advantages will appear as the description of the invention proceeds.

The invention consists in a control device including a plurality of guides so arranged as to form a path of travel for the end of a lever which, through suitable connections, is adapted to start, stop and reverse the motion of the main machine with which the control device is associated, various devices being interposed in the path of travel of the lever end whereby it is shifted from one position to another and intercepted, and the invention consists further in various structural arrangements and details, all as I will proceed now to explain and finally claim.

In the accompanying drawings, illustrating the invention, in the several figures of which like parts are similarly designated, Figure 1 is a side elevation of the device of the invention complete. Fig. 2 is a top plan view thereof. Fig. 3 is a section taken in the plane of line 3—3, Fig. 1. Fig. 4 is a section taken in the plane of line 4—4, Fig. 1. Fig. 5 is a perspective view of one of a pair of latch members. Fig. 6 is a bottom view of the guide member showing the means for adapting the device for work of different lengths, numerous parts being removed in the interest of clearness.

Referring to the drawings more in detail 1 designates a shaft of the main machine adapted to be controlled by the device of my invention, one of the rolls 1' of the machine being shown thereon, and on this shaft is a pinion 2 which meshes with a rack 3 held in proper operative engagement with the pinion 2 by rollers 4 journalled in a suitable frame 5 resting upon and fastened to the floor 6. I prefer to form the pinion 2 by cutting teeth in the shaft 1, thereby to some extent reducing the length of the device.

Secured to the end of the rack bar 7 is a rectangular guide member 8 braced with relation to the rack bar 7 by a brace member 8' and formed of a plurality of guides 9 and 10 which form between them a pair of paths 11, the members 9 and 10 being held in proper relation to each other by suitable connecting members 12 abridging the paths 11, as shown particularly in Figs. 1 and 3.

Pivoted to the guides 9, as at 13, are similar levers 14 and 15 normally forced inward by springs 16 surrounding guide rods 17 having bearings in the guides 9 and in brackets 18, which latter function also as abutments for the outward ends of the springs 16.

In a suitable bearing member 19, secured to the floor as by feet 20 and lag screws 21, is mounted in a horizontal bearing a control member or oscillating lever 22, one end 23 of which extends to the drive control of the machine. The other end 24 of this lever is bent upwardly and extends into the plane of the paths 11 formed by the guides 9 and 10. When the end 24 of this lever is in the position shown in full lines in Fig. 3, the machine will operate in one direction, and when the lever is in the position shown in dotted lines, the machine will operate in the opposite direction. When the lever is in a substantially vertical position, the drive control is in neutral and the machine is stopped.

To effect the starting and stopping of the machine I provide a foot operated lever 25 fulcrumed at 26, and having its power exerting end 27 connected to one end 28 of a rocker arm 29 pivoted at 30, the other end 31 of which is pivoted to a frame 32 carrying a pair of segmental pinions 33 which mesh with a pair of gears (not shown) of the main machine for controlling various devices which affect the contour of the article operated upon. It will be seen that when the pedal 34 of the lever 25 is depressed, the rocker arm 29 will exert a downward pull upon the frame 32 and will cause the pinions 33 to turn upon their pivots 35. This depressing of the pedal 34 also pulls upon the chain or the like connecting means 36 between the lever 25 and an arm 37 also pivoted at 26, the chain being connected to both and running under a pulley 38 secured to the floor 6. The arm 37 passes through and is guided in its vertical movement by a slot 39 (see Fig. 3) in the bearing member 19, and is normally forced upward by a spring 40. The vertically upturned end 41 of the arm 37 is adapted to project, when in its normal upward position, into a slot 42—43 in one or the other of a pair of latch members 44—45 respectively (shown in dotted lines in Fig. 2, and in detail in Fig. 5) mounted for sliding movement relative to and beneath the guides 10, and normally drawn toward each other by a spring 46.

In order that the device may be adapted for use in forming fenders and the like of various lengths, I provide auxiliary frame members 47 and 48 at opposite ends of the guide member 8 and provide the members 10 with slots 49 through which pass screws 50 threaded into the members 47 and 48. By this arrangement it will be seen that the members 47 and 48 may be extended longitudinally of the guide member and fixed in adjusted relation thereto, thereby proportionately lengthening the travel of the end 24 of lever 22 before it is shifted from one side to the other of path 11, and consequently relatively lengthening the travel of the fender or the like through the rolling machine before the machine is reversed by the shifting of lever 22.

The operation of the device is substantially as follows:—Assuming that the device is used in connection with a machine for rolling fenders, and that power for operating it is derived from such machine through shaft 1; in order to start the machine, the operator or attendant operates the pedal 34 which in turn operates the segmental pinions 33 to adjust the rolling machine for its operation, and, simultaneously, this operation of the pedal 34 through the chain and pulley connection 36—38 withdraws the end 41 of arm 37 from the slot 42 or 43 of whichever latch member 44 or 45 it happens to be engaged with and allows the spring 46 of the latch member to draw it in to its normal position, thereby withdrawing stop 51 or 52 of latch member 44 or 45, from the path of movement of the end 24 of lever 22, and lever 14 or 15, as the case may be, by the pressure of its spring 16, pushes the end 24 of lever 22 over against guide 9 and into path 11. The operation of lever 22 starts the rolling machine and consequently the revolution of the shaft 1 which through pinion 2 moves rack 3, let us say to the right, Fig. 2, pulling with it the guide member 8 and causing the end 24 of lever 22 to travel in the section A of path 11. In this movement of the member 8 the lever 14 will strike end 24 and will be depressed by it against the pressure of its spring 16 so long as end 24 travels in section A, but as soon as end 24 reaches and passes by corner B it will be thrown across to section C of path 11, that is, to the position shown in dotted lines in Fig. 3, and the operation of the rolling machine will be reversed. This reversal rotates shaft 1 and pinion 2 in the opposite direction, and, consequently, moves guide member 8 to the left, causing end 24 of lever 22 to travel in section C of path 11 and depress lever 15 in the same manner as it depressed lever 14 until corner D is reached and lever 15 throws end 24 over into path A again, thus again reversing the machine and the travel of rack 3 and member 8.

It will be understood that the pedal 34 has, during this entire period, been held depressed, but if it is desired to stop the rolling machine, the pedal is released and spring 40 will raise arm 37 so that its end 41 contacts with latch members 44—45 and as these members are travelling with guide member 8, and arm 37 is stationary, the slot 42 or 43 of one or the other of them is bound to register with the end 41 of the arm and any further movement of member 8 will project stop 51 or 52 into the path of movement of the end 24 of lever 22, and will, in addition, lengthen the section A or C of path 11, by projecting part 53 or 54 of latch 44 or 45 as the case may be, beyond the ends of members 10 or 47 or 48, whichever is outermost. This lengthens the travel of end 24 and allows the fender to be ejected from between the rolls of the machine. Now, as end 24 traverses its path from section A to section C of path 11, or vice versa, as the case may be, it will come in contact with the projected stop 51 or 52 and be held from further lateral movement, thereby shifting the drive mechanism of the rolling machine to neutral and stopping the machine.

In an effort to make the nature and operation of my invention clear, it has been necessary, in the foregoing description, to describe specific details of construction and arrangement of parts, but I do not intend thereby to be understood as limiting my invention to such details as shown and described, as it is obvious that various changes may be made therein without departing from the spirit of the invention or the scope of the following claims.

What I claim is:

1. In a control device for use with a power operated machine, a control member having one of its ends operatively connected with the power control mechanism of said machine, a guide member driven by said machine and having a plurality of guides forming a pair of paths with which the other end of said control member cooperates, means for shifting said control member from one path to the other to reverse the direction of drive of said machine and said guide member, and means insertible in the path of movement of said control member from one path to the other for arresting said control member in its travel from path to path to stop said machine.

2. In a control device for use with a power operated machine, an oscillating control lever adapted to start, stop and reverse the machine, a guide member provided with guides for said lever, means on said guide member for shifting said oscillating lever from one to the other of two positions for the purpose of reversing the operation of the machine, means on said guide member for arresting said lever during its shifting, manually controlled means for bringing said arresting means into and cutting them out of operation, and means operated by said machine for imparting to said guide member motion consonant with the motion of the machine.

3. In a control device for use with a power operated machine, a control lever mounted for oscillatory movement and adapted to operate the power control mechanism of the machine, a guide member comprising a plurality of guides cooperating with said lever, means connected with said guide member and receiving reciprocatory motion from a moving part of the machine for actuating the guide member, spring-operated devices carried by said guide member and adapted to intermittently oscillate said lever in synchronism with the reciprocation of said guide member whereby the machine is reversed and the reciprocation of said guide member effected, stop members mounted on said guide member and adapted to intercept said lever in its oscillatory movement, and manually operated means for actuating said stop members.

4. In a control device, for use with a rolling machine, a guide member adapted to be reciprocated by said machine, a control member cooperating with said guide member and operatively connected with the power control of said machine whereby said machine is reversed and reciprocatory motion imparted to said guide member, and means on said guide member and adapted to cooperate with said control member to vary the length of reciprocation of said guide member and consequently the time of reversing of said machine to accommodate work of different lengths.

5. In a control device for use with a power operated machine, an oscillating control lever adapted to reverse the machine, a guide member reciprocated by the machine, a parallel guide means on the member for guiding said lever, and a shifting means at each end of said guide member for moving the lever from one guide means to the other to reverse the machine and also the direction of movement of the guide member.

6. In a control device for use with a power operated machine, an oscillating control lever adapted to reverse the machine, a guide member reciprocated by the machine, parallel guide means on the member for guiding said lever, a shifting means at each end of said guide member for moving the lever from one guide means to the other to reverse the machine and also the direction of movement of the guide member, and means to vary the effective length of said guide means to vary the number of revolutions of the machine in each direction.

7. In a control device for use with a rolling machine for passing articles back and forth therethrough, an oscillating control lever and a stop lever, a guide member reciprocated by the machine, guide means on the member for guiding said control lever, shifting means at each end of said member for shifting said control lever from one guide means to the other to reverse the machine, and stop means at each end of the member adapted to be engaged by the stop lever when moved to stop position, to arrest the control lever in its movement from one guide means to the other whereby the rolling machine will be stopped with the article at one limit of its travel through the machine.

In testimony whereof I affix my signature.

ROBERT Z. TYLER.